Oct. 3, 1967    W. MAIER    3,344,502
METHOD OF MAKING AN ELECTRICAL OUTLET BOX
Original Filed Jan. 11, 1965    2 Sheets-Sheet 1
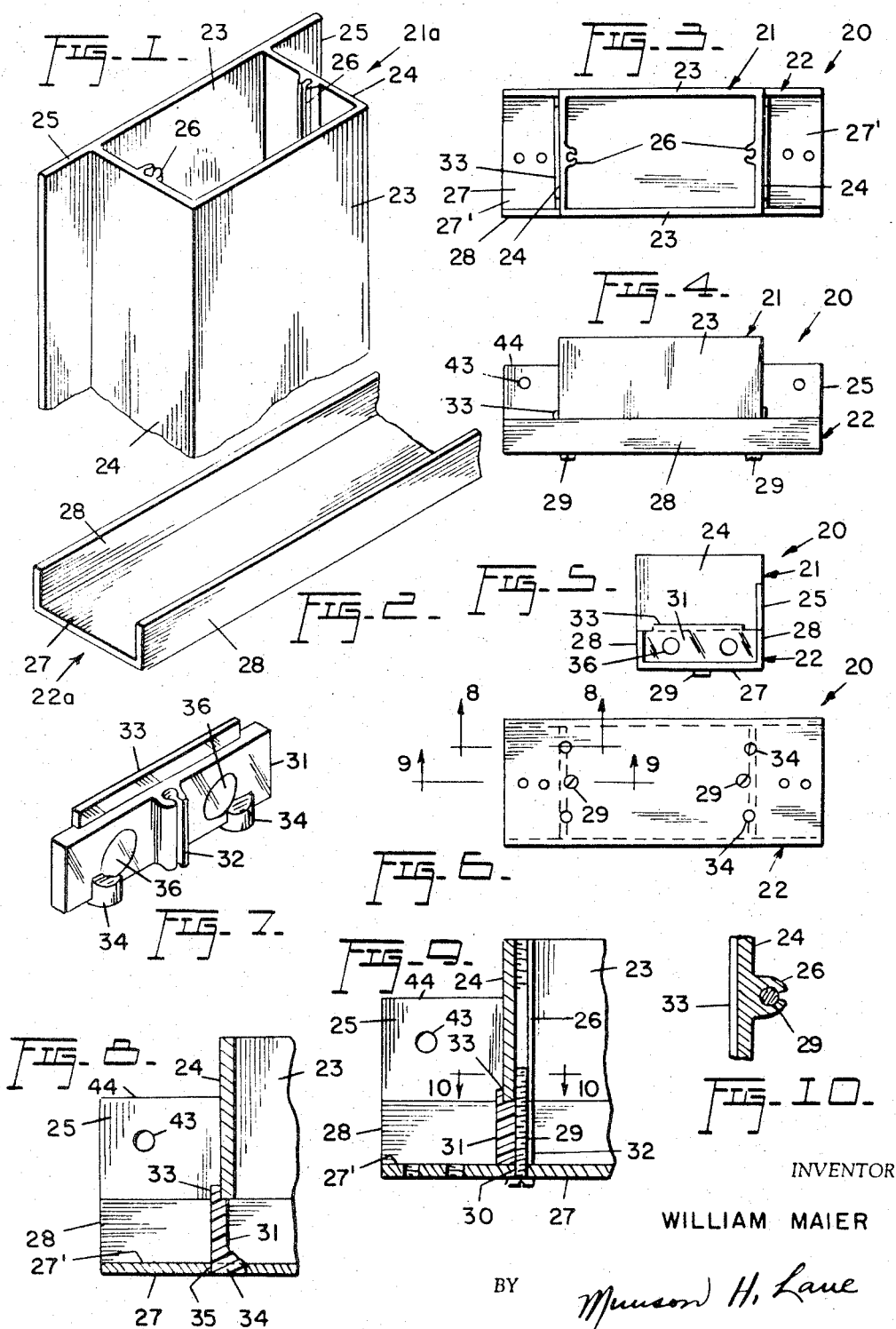
INVENTOR
WILLIAM MAIER
BY Munson H. Lane
ATTORNEY Oct. 3, 1967 W. MAIER 3,344,502
METHOD OF MAKING AN ELECTRICAL OUTLET BOX
Original Filed Jan. 11, 1965 2 Sheets-Sheet 2
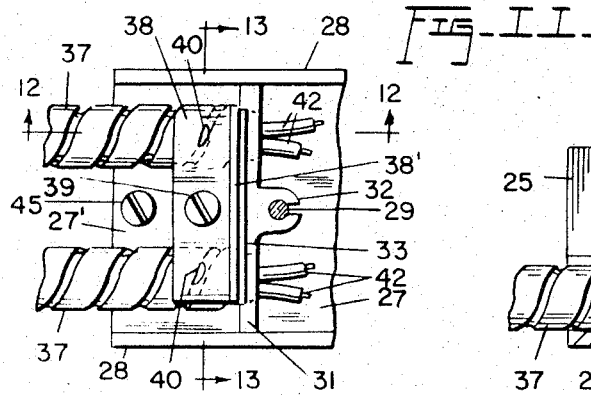
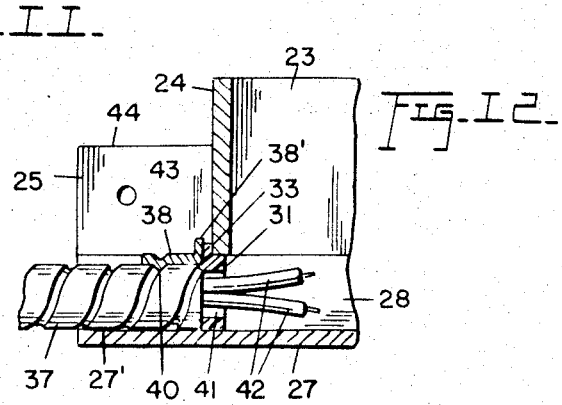
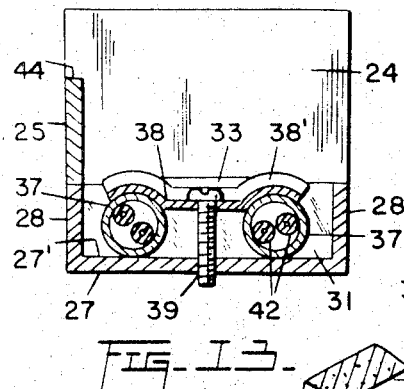
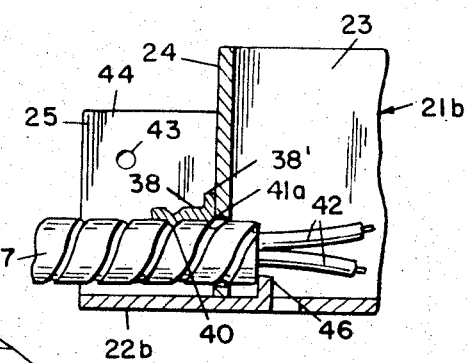
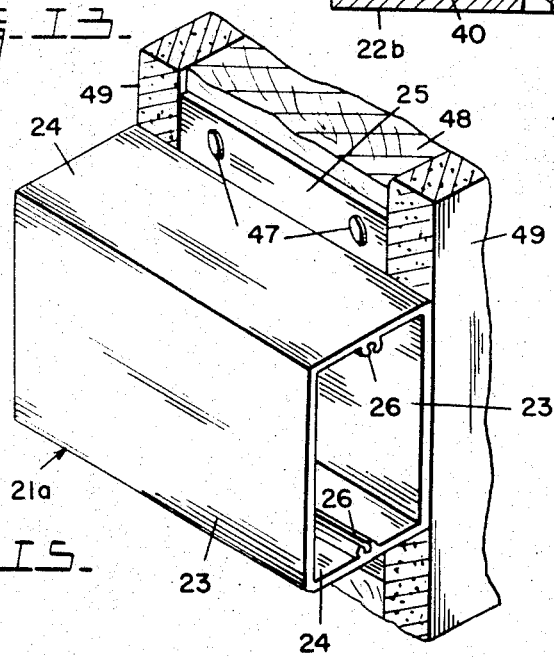
INVENTOR
WILLIAM MAIER
BY Munson H. Lane
ATTORNEY United States Patent Office 3,344,502
Patented Oct. 3, 1967

3,344,502
METHOD OF MAKING AN ELECTRICAL
OUTLET BOX
William Maier, Bridgeport, Conn.
(125 Lawlor Terrace, Stratford, Conn. 06497)
Original application Jan. 11, 1965, Ser. No. 424,478. Divided and this application Aug. 26, 1966, Ser. No. 575,346
3 Claims. (Cl. 29—417)

ABSTRACT OF THE DISCLOSURE

The present invention discloses a method of making an electrical outlet box, the steps of making structural extrusions of a running length with cross-sections of said extrusions conforming substantially to that of the box desired, cutting said extrusions at their running lengths into box sections of a desired dimension, and assembling the cut extrusions into a box.

---

The present application relates to a method of making an electrical outlet box by an extrusion process and is a division of my application Ser. No. 424,478, filed Jan. 11, 1965 wherein the improved outlet box is claimed.

This invention relates to new and useful improvements in a method of making electrical outlet boxes such as are used in conjunction with switches, outlet receptacles, and the like, and the principal object of the invention is to provide a box of this type which is of a unique sectional construction and has its sections formed from metal extrusions cut to appropriate lengths so that the dimensions of the box may easily be made to suit requirements and so that the box may be quickly and economically produced without the conventional necessity of metal forming, bending, blanking, shaping, et cetera.

Another object of the invention is to provide an improved method of making an outlet box comprising extruded sections which may be readily assembled into a complete box form in readiness for convenient installation.

Another object of the invention is to provide an improved method of making an outlet box which is equipped with means at the outside of the box body for securing conductor cables thereto, as distinguished from the conventional arrangement wherein such securing means are at the inside of the box. As a result, the outside cable securing means of the invention leave the box interior relatively unobstructed so that the full interior of the box is available to accommodate switches, outlet receptacles, wiring, and the like. Also, by disposing the cable securing means at the outside rather than inside the box, such securing means are more easily accessible and electrical connections to the box can be more readily made.

Another feature of the invention resides in providing, in conjunction with the cable securing means outside of the box, a box body with an insert of non-metallic, electrically insulating material such as plastic, for example, such an insert being provided with an opening through which conductors of a cable secured outside the box may pass into the box itself, without any danger of electrical shorts between the box and the conductors.

More particularly the present-invention comprises a method of making an electrical outlet box, the steps of making structural extrusions of a running length with cross-sections of said extrusions conforming substantially to that of the box desired, cutting said extrusions at their running lengths into box sections of a desired dimension, and assemblying the cut extrusions into a box.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary perspective view of a metallic extrusion used in forming the main body section of the box;

FIG. 2 is a fragmentary perspective view of a metallic extrusion used in forming the bottom section of the box;

FIG. 3 is a top plan view of a box assembled from the extrusions of FIGS. 1 and 2 cut to proper length;

FIG. 4 is a side elevational view of the assembled box;

FIG. 5 is an end view thereof;

FIG. 6 is a bottom plan view thereof;

FIG. 7 is an enlarged perspective view of one of the inserts;

FIG. 8 is an enlarged, fragmentary sectional detail, taken substantially in the plane of the line 8—8 in FIG. 6;

FIG. 9 is an enlarged, fragmentary sectional detail, taken substantially in the plane of the line 9—9 in FIG. 6;

FIG. 10 is an enlarged, fragmentary sectional detail, taken substantially in the plane of the line 10—10 in FIG. 9;

FIG. 11 is an enlarged, fragmentary plan view showing the cable connection to one end of the bottom section of the box, the main body section of the box being omitted for sake of clarity;

FIG. 12 is a fragmentary sectional view, taken substantially in the plane of the line 12—12 in FIG. 11, but also showing the main body section of the box;

FIG. 13 is a cross-sectional view, taken substantially in the plane of the line 13—13 in FIG. 11;

FIG. 14 is a fragmentary sectional view, similar to that shown in FIG. 12, but illustrating a modified embodiment; and FIG. 15 is a fragmentary perspective view showing the extrusion of FIG. 1 used as a "through-wall" outlet box.

Referring now to the accompanying drawings in detail, more particularly to FIGS. 1–13 inclusive, the electrical outlet box of the invention is designated generally by the reference numeral 20 and consists of two main components, namely, a main body section 21 and a bottom section 22.

The main body section 21 is formed from a metal extrusion 21a shown in FIG. 1, the extrusion having a box-shaped, rectangular cross-section with open ends, including pairs of side or end walls 23, 24. Laterally projecting flanges 25 extend beyond the walls 24 in coplanar relation with one of the walls 23, and the walls 24 are provided at the inside thereof with a pair of grooved ribs 26 which are extruded integrally therewith. The cross-section of these ribs is best shown in FIG. 10.

The bottom body section 22 is also formed from a metal extrusion 22a shown in FIG. 2, this extrusion being in the form of a U-shaped channel and including a bottom wall 27 and a pair of side flanges 28.

The width of the extrusion 22a corresponds to the transverse dimension or thickness of the box section of the extrusion 21a, so that when the two extrusions in running length are cut, they form the main body section and the bottom section of the box. The running length of the extrusion 21a is cut so that, in conjunction with the depth of the extrusion 22a, it corresponds to the overall depth of the outlet box desired. The running length of the extrusion 22a is cut so that it corresponds to the overall dimension of the extrusion 21a across the flanges 25. The cut length of the main body section 21 is then placed on top of the cut length of the bottom section 22 as shown in FIGS. 3–5 and the two box sections are secured together by a pair of screws 29 which are extended through apertures 30 drilled in the bottom wall 27 of the section 22 (see FIG. 9). These screws are long enough so that they extend into the lower end portions of the grooves in the ribs 26 of the body section 21, as will be readily apparent.

It will be observed that since the lower edges of the walls 24 of the section 21 terminate at the level of the top edges of the flanges 28 of the section 22, spaces exist between the lower edges of the walls 24 and the bottom wall 27 of the section 22. These spaces are filled in by inserts 31 which are made of non-metallic, electrically insulating material such as plastic, and which are provided with integral, grooved ribs 32. The latter correspond to and are in alignment with the ribs 26 of the walls 24 and, as shown in FIG. 9, the aforementioned screws 29 extend through the grooved ribs 32 before they enter the ribs 26, so that the screws serve not only to hold the box sections 21, 22 together, but also to hold the inserts 31 in place. In order to prevent the inserts from turning about the screws, each insert is provided at its upper edge with a lip 33 which abuts the outer surface of the wall 24 which it overlaps. Moreover, the lower edge of each insert is provided with a pair of lugs 34, seated in apertures 35 formed in the bottom wall 27 of the section 22, as is best shown in FIG. 8. It will be also noted that each insert 31 is provided with a pair of knock-out plugs 36 (see FIG. 7) which, when knocked out, provide openings through which conductors may be extended into the box, as will be hereinafter described.

Since the box section 22 projects beyond the walls 24 to the extent of the overall dimension across the flanges 25 of the box section 21, the end portions of the bottom wall 27 disposed at the outside of the walls 24 constitute platforms, indicated at 27′ on which electrical cables 37 may be secured for connection to the box, as shown in FIGS. 11–13. For this purpose, a cable clamp 38 is provided on each platform 27′, being mounted thereon by a suitable screw 39, the clamp frictionally engaging the cables 37 and being provided at one side thereof with a lip 38′ which abuts the lip 33 of the insert 31 and prevents the clamp from turning about the screw 39. If desired, the clamp may be also provided with detents 40 to engage the cables 37 and positively prevent displacement thereof in a longitudinal direction.

The openings 41 formed in the inserts 31 by removal of the aforementioned knock-out plugs 36 are smaller than the outside diameter of the cables 37 (see FIG. 12), and the ends of the cables abut the inserts 31 so that the latter constitute stops to limit the extent to which the cables may be pushed toward the box before the clamps 38 are secured. However, the usual conductors 42 of the cables 37 pass through the openings 41 into the box for connection to a switch, outlet receptacle, or the like (not shown) with which the box is ultimately equipped. It will be observed that the non-metallic, insulating material of the inserts 31 will prevent any possible electrical short between the conductors 42 and the metallic sections 21, 22 of the box. Also, it will be noted that since the cables 37 are fastened to the platforms 27′ at the outside of the box, the box interior is not obstructed by the cable securing means, as it is in boxes of conventional types.

The aforementioned flanges 25 of the box section 22 are provided with apertures 43 in which nails or screws may be placed for mounting the entire box in position in a wall. As is customary, these flanges may be cut away as at 44 at a suitable distance from the top or outer edge of the box, to compensate for thickness of wall plaster, either dry or wet installed, thus locating the box in proper position during installation before construction of the wall is completed. Also, a suitable screw 45 may be provided on the external platform 27′ (see FIG. 11) so that a ground wire (not shown) may be connected to the box.

In the modified embodiment shown in FIG. 14 the arrangement of the box section 21b is substantially the same as that of the section 21, except that the section 21b is somewhat deeper because the channel-shaped bottom section 22 is not used and a simple flat plate or strip 22b is utilized in its place. In this instance the non-metallic inserts 31 are also omitted and the wall 24 of the box section 21b is formed with an opening 41a, through which the end portion of the cable 37 is extended into the box. The cable is still secured by the clamp 38 at the outside of the box and a stop of the cable end is provided inside the box by an inwardly struck detent 46 integral with the bottom plate or section 22b, as will be apparent.

It will be understood, of course, that in the embodiment of FIG. 14 the bottom section 22b is secured to the body section 21b by the means 26, 29, as already described in connection with the embodiment of FIGS. 1–13.

FIG. 15 illustrates the metal extrusion 21a of FIG. 1 as being cut to proper length for use as a "through-the-wall" box, the same being open at both ends and mounted by its flanges 25 with fasteners 47 on the studding 48 so that the ends of the box are flush with either wet or dry wall plastering 49, 49 at the opposite faces of the studding. It will be understood that the running length of the extrusion 21a from which the box is formed permits the box to be cut so as to conform to any desired thickness of the wall.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

I claim:

1. In a method of making an electrical outlet box, the steps of making structural extrusions of a running length with cross-sections of said extrusions conforming substantially to that of the box desired, cutting said extrusions at their running lengths into box sections of a desired dimension, and assembling the cut extrusions into a box.

2. In a method of making an electrical outlet box, the steps of making a structural extrusion of a running length with a cross-section conforming substantially to that of a box body, cutting said extrusion at its running length into a box body of a desired dimension, making a structural extrusion of a running length with a cross-section corresponding substantially to that of a box bottom, cutting said last mentioned extrusion at its running length into a box bottom of a desired dimension, and assembling the cut box body and the cut box bottom into a box.

3. The method as defined in claim 2 together with the steps of forming the box body extrusion with grooved ribs, forming the box bottom extrusion with apertures aligned with the grooves in said ribs, and installing fastening elements in said apertures and grooves of said ribs to hold the box body and bottom assembled.

References Cited

FOREIGN PATENTS

| 398,190 | 7/1933 | Great Britain. |
| 672,222 | 9/1952 | Great Britain. |

JOHN F. CAMPBELL, *Primary Examiner.*

THOMAS H. EAGER, *Examiner.*